US011327623B2

United States Patent
Garrett et al.

(10) Patent No.: US 11,327,623 B2
(45) Date of Patent: May 10, 2022

(54) DETECTING MULTIPLE MANUAL INTERACTIONS

(71) Applicant: Peratech Holdco Ltd, Richmond (GB)

(72) Inventors: Michael Robert Garrett, Stockholm (SE); Joel Erik Christoffer Metelius, Nakca (SE)

(73) Assignee: Peratech Holdco Ltd, Richmond (GB)

( * ) Notice: Subject to any disclaimer, the term of this patent is extended or adjusted under 35 U.S.C. 154(b) by 59 days.

(21) Appl. No.: 16/605,771

(22) PCT Filed: Apr. 17, 2018

(86) PCT No.: PCT/GB2018/000068
§ 371 (c)(1),
(2) Date: Oct. 16, 2019

(87) PCT Pub. No.: WO2018/193221
PCT Pub. Date: Oct. 25, 2018

(65) Prior Publication Data
US 2021/0124471 A1   Apr. 29, 2021

(30) Foreign Application Priority Data
Apr. 21, 2017   (GB) ...................... 1706362

(51) Int. Cl.
*G06F 3/045* (2006.01)
*G06F 3/041* (2006.01)

(52) U.S. Cl.
CPC .......... *G06F 3/045* (2013.01); *G06F 3/04144* (2019.05); *G06F 3/04186* (2019.05); *G06F 2203/04104* (2013.01)

(58) Field of Classification Search
None
See application file for complete search history.

(56) References Cited

U.S. PATENT DOCUMENTS

| | | | |
|---|---|---|---|
| 8,427,444 B2 | 4/2013 | Wu et al. | |
| 8,619,056 B2 | 12/2013 | Lin et al. | |
| 2009/0303196 A1 | 12/2009 | Furukawa | |
| 2010/0188345 A1 | 7/2010 | Keskin et al. | |
| 2011/0248932 A1 | 10/2011 | Wu et al. | |
| 2013/0257796 A1 | 10/2013 | Kawai | |
| 2015/0081249 A1* | 3/2015 | Ye | G06F 11/3428 702/186 |
| 2015/0177898 A1* | 6/2015 | Hirata | G06F 3/047 345/173 |
| 2016/0092022 A1 | 3/2016 | Lee et al. | |

FOREIGN PATENT DOCUMENTS

EP   2879031 A1   6/2015
KR   2011-0070097 A   6/2011

* cited by examiner

*Primary Examiner* — Amare Mengistu
*Assistant Examiner* — Sarvesh J Nadkarni
(74) *Attorney, Agent, or Firm* — Richard M. Goldberg

(57) ABSTRACT

The detection of multiple manual interactions upon a touch-pad is shown. Drive lines intersect a scan lines and each intersection between a drive line and a scan line includes an element of variable resistance. A scanning processor energises the drive lines and monitors the scan lines. The scanning processor is configured to identify positions of manual interaction, validate identified positions to identify potentially erroneous positions and remove positions identified as erroneous. However, removed positions are re-introduced when they are not in the vicinity of other identified positions.

8 Claims, 14 Drawing Sheets

DETECTING MULTIPLE MANUAL INTERACTIONS

CROSS REFERENCE TO RELATED APPLICATIONS

This application claims priority from GB 1706362.9 filed 21 Apr. 2017, the whole contents of which are incorporated herein by reference.

BACKGROUND OF THE INVENTION

The present invention relates to an apparatus for detecting multiple manual interactions, of the type comprising a touch-pad for receiving multiple manual interactions.

The present invention also relates to a method of detecting positions of multiple manual interactions on a touch-pad, of the type comprising the steps of energising a plurality of drive lines sequentially and monitoring a plurality of intersecting scan lines to locate positions of interaction that may include erroneous positions.

The present invention also relates to an apparatus for receiving data input from a user, in which a user applies a plurality of fingers on a touch-pad, of the type comprising a plurality of drive lines that intersect with a plurality of scan lines to define an array Touch-pads are known in which a plurality of drive lines intersect with a plurality of scan lines to define an array. An element of variable resistance is provided at each intersection of the array, presenting a high resistance at each intersection until mechanical pressure is applied, whereupon resistance reduces significantly thereby allowing conduction to take place.

Increasingly, touch-pads of this type are required on which it is possible to apply multiple fingers, thereby identifying multiple positions and performing gestural movements. A problem with resistive arrays designed for multiple interactions is that additional undesirable conduction paths may be introduced within the array itself, thereby creating data that suggests an interaction has taken place at a location where no interaction was present. This in turn may result in an erroneous interpretation of the input data, in which it appears that an additional finger, not actually present, has caused an interaction. This situation has become known as "ghost finger".

A known approach to reducing problems associated with ghost finger involves eradicating additional current paths within the sensor array. Sense lines are provided that are scanned sequentially. It is therefore possible to ground each of the lines that are not being sensed, thereby removing parallel conductive paths in the array. However, a problem associated with this approach is that the conducting grounded paths reduce the total level of current present within the array and therefore reduce the amount of current available for detecting pressure values. Consequently, the resolution of pressure evaluations becomes significantly restricted, with the overall response of the sensor becoming less sensitive to pressure measurement in what is usually referred to as the Z direction.

Thus, a problem exists in that any attempt to reduce the presence of the ghost finger problem will in turn reduce the overall sensitivity of the array in the Z dimension.

BRIEF SUMMARY OF THE INVENTION

According to a first aspect of the present invention, there is provided an apparatus for detecting multiple manual interactions, in accordance with the claims.

According to a second aspect of the present invention, there is provided a method of detecting positions of multiple manual interactions on a touch-pad in accordance with the claims.

According to a third aspect of the present invention, there is provided an apparatus for receiving data input from a user in accordance with the claims.

Embodiments of the invention will be described, by way of example only, with reference to the accompanying drawings. The detailed embodiments show the best mode known to the inventor and provide support for the invention as claimed. However, they are only exemplary and should not be used to interpret or limit the scope of the claims. Their purpose is to provide a teaching to those skilled in the art. Components and processes distinguished by ordinal phrases such as "first" and "second" do not necessarily define an order or ranking of any sort.

DETAILED DESCRIPTION OF EXAMPLE EMBODIMENTS

FIG. 1

Figure 1:
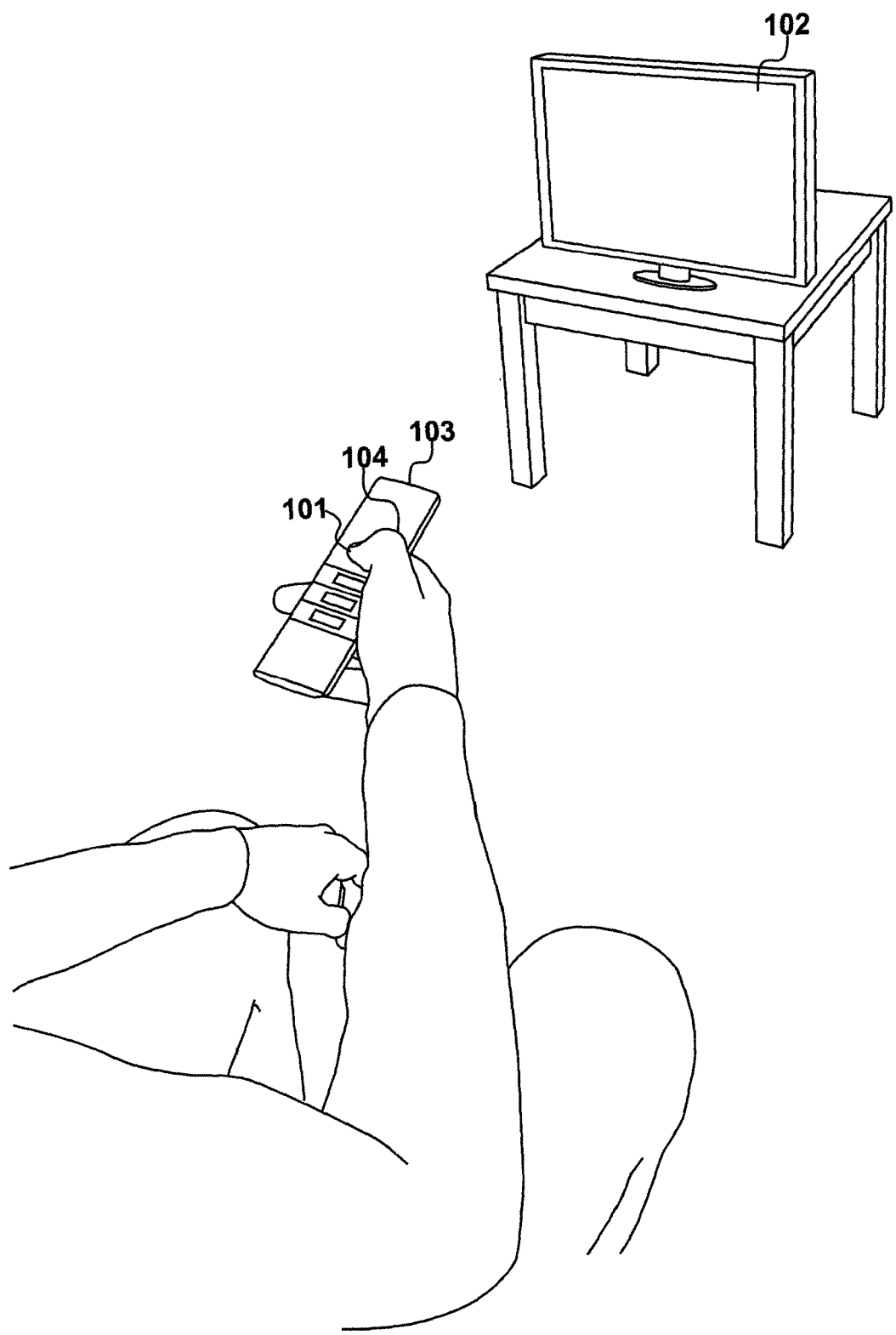
FIG. 1 shows an apparatus for producing an output control signal.

An apparatus 101 is shown in FIG. 1 for producing an output control signal which, for the purposes of this illustration, controls a television receiver 102. The apparatus 101 includes a housing 103 that defines an interactive surface 104 for receiving mechanical pressure due to operations performed by a user.

FIG. 2

The apparatus 101 includes a plurality of detection-elements mounted on a substrate 201. These are placed in mechanical proximity to the interactive surface 104. Each sensor-element is substantially electrically non-conductive before a mechanical interaction occurs and becomes increasingly conductive with increasing levels of interaction.

The substrate 201 is connected to a microcontroller 202. The microcontroller 202 is configured to supply drive voltages to the sensor-elements and receive sense-currents from these sensor-elements.

The apparatus is responsive to a manual operation, such as the movement of a user's thumb over the interactive surface. Furthermore, it is possible for multiple points of contact to be made and for gestural operations to be interpreted, thereby expanding the available menu of user interactions that may be used to perform control functions.

Figure 2:
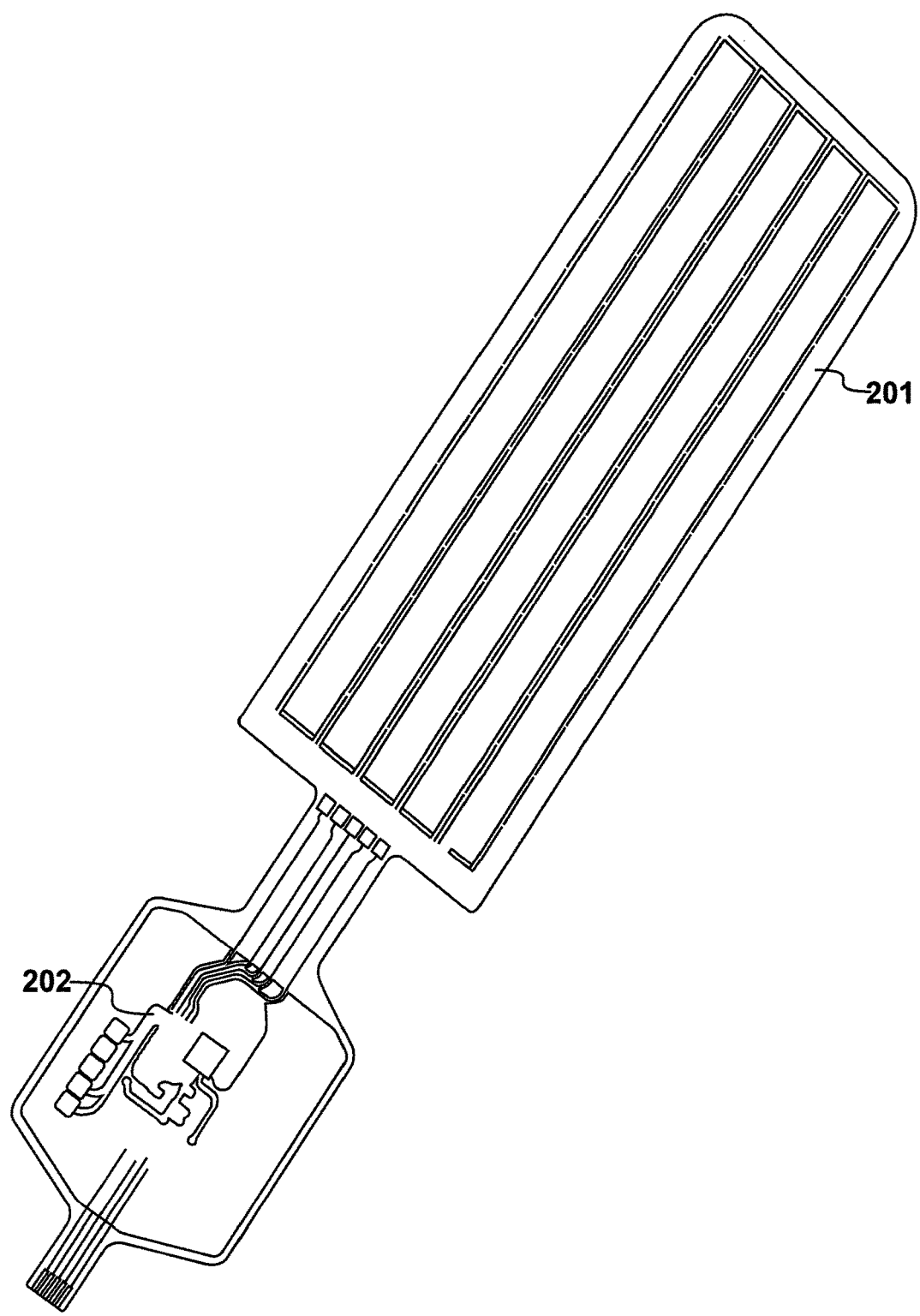
FIG. 2 shows sensor-elements mounted on a substrate in the device identified in FIG. 1.

In the example shown in FIG. 2, the sensor-elements are arranged as an array behind the interactive surface 104. In this particular example, the array includes fourteen sensor-elements along its length and five sensor-elements across its width, giving a total of seventy individual sensor-elements. However, it should be appreciated that other configurations are possible while still benefiting from aspects of the present invention.

FIG. 3

Figure 3:
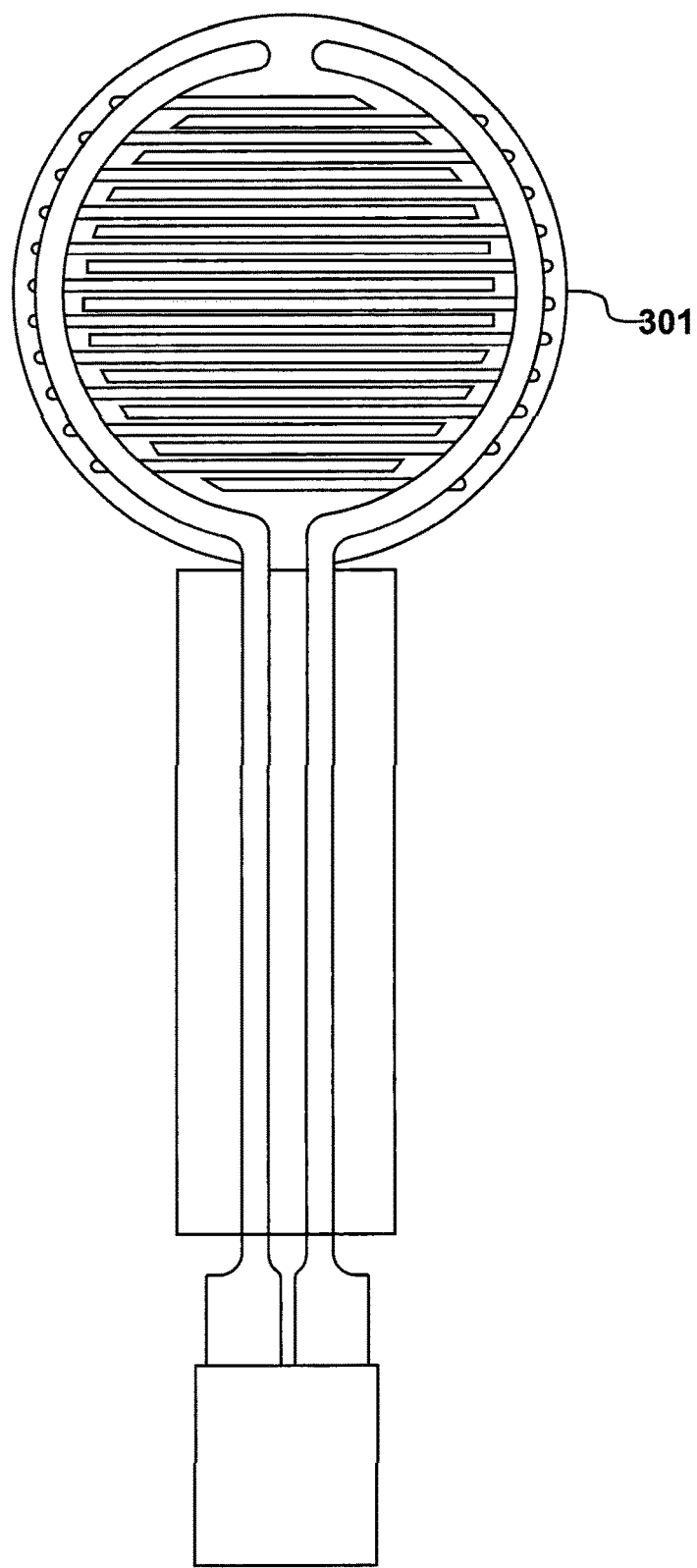
FIG. 3 shows an individual sensor-element.

An individual sensor-element is shown in FIG. 3 and may take the form of a sensor including material sold under the trademark QTC by the current applicant. Material of this type is also identified by the designation quantum tunneling compound.

QTC sensor-elements, such as sensor-element 301, are pressure sensitive membrane switches that change resistance in a predictable manner following an application of force. In the circuitry disclosed herein, the sensor may be seen as a variable resistor that can be implemented within an electronic system using a voltage divider circuit.

FIG. 4

Figure 4:
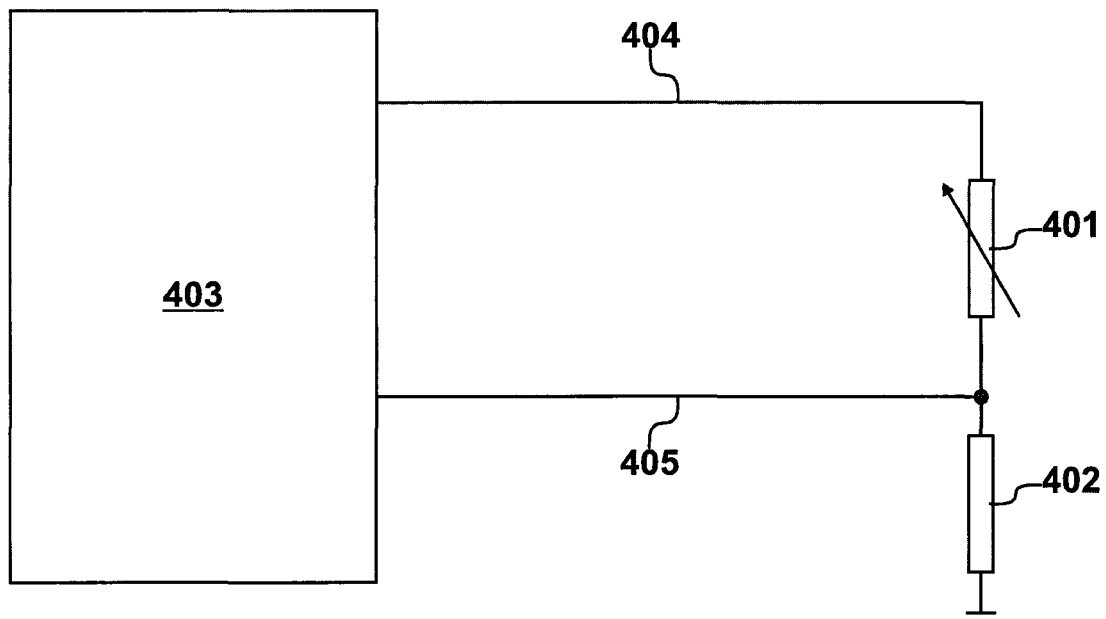
FIG. 4 illustrates a single point sensor.
Figure 5:
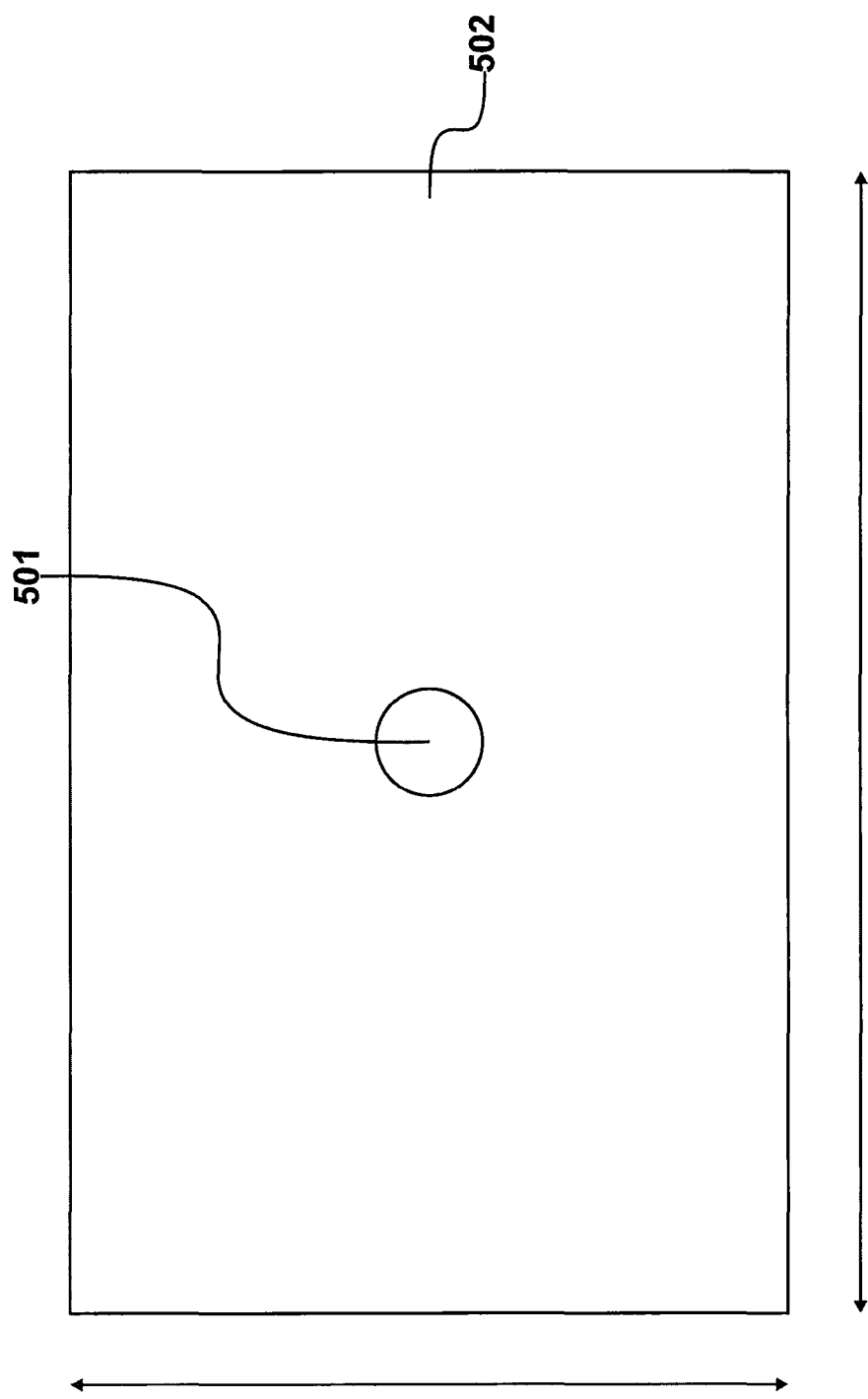
FIG. 5 shows an alternative embodiment for a single point sensor.

The single point sensor illustrated in FIG. 3 is shown modelled as a variable resistor 401 in FIG. 4. This has a modelled resistance of $R_s$. This is connected in series with a fixed resistor 402 having a reference resistance of $R_{ref}$.

A microcontroller 403 provides an input voltage $V_{in}$ on an anolog output line 404. From the series connection of resistor 401 with resistor 402, an output voltage $V_{out}$ is supplied on an input line 405 to the microcontroller 403, where it is received by an anolog to digital convertor.

As shown at 406, the resistance $R_s$ of the sensor may be calculated by dividing the input voltage $V_{in}$ by the output voltage $V_{out}$, subtracting unity and multiplying this by the reference voltage $R_{ref}$ of resistor 402.

FIG. 5

It is possible for a single sensor 501, of the type shown in FIG. 3, to determine z-axis deflection as a result of force being applied to a flat plane 502. Thus, by measuring the voltage across sensor-element 501, force applied to flat plane 502 can be determined.

FIG. 6

Figure 6:
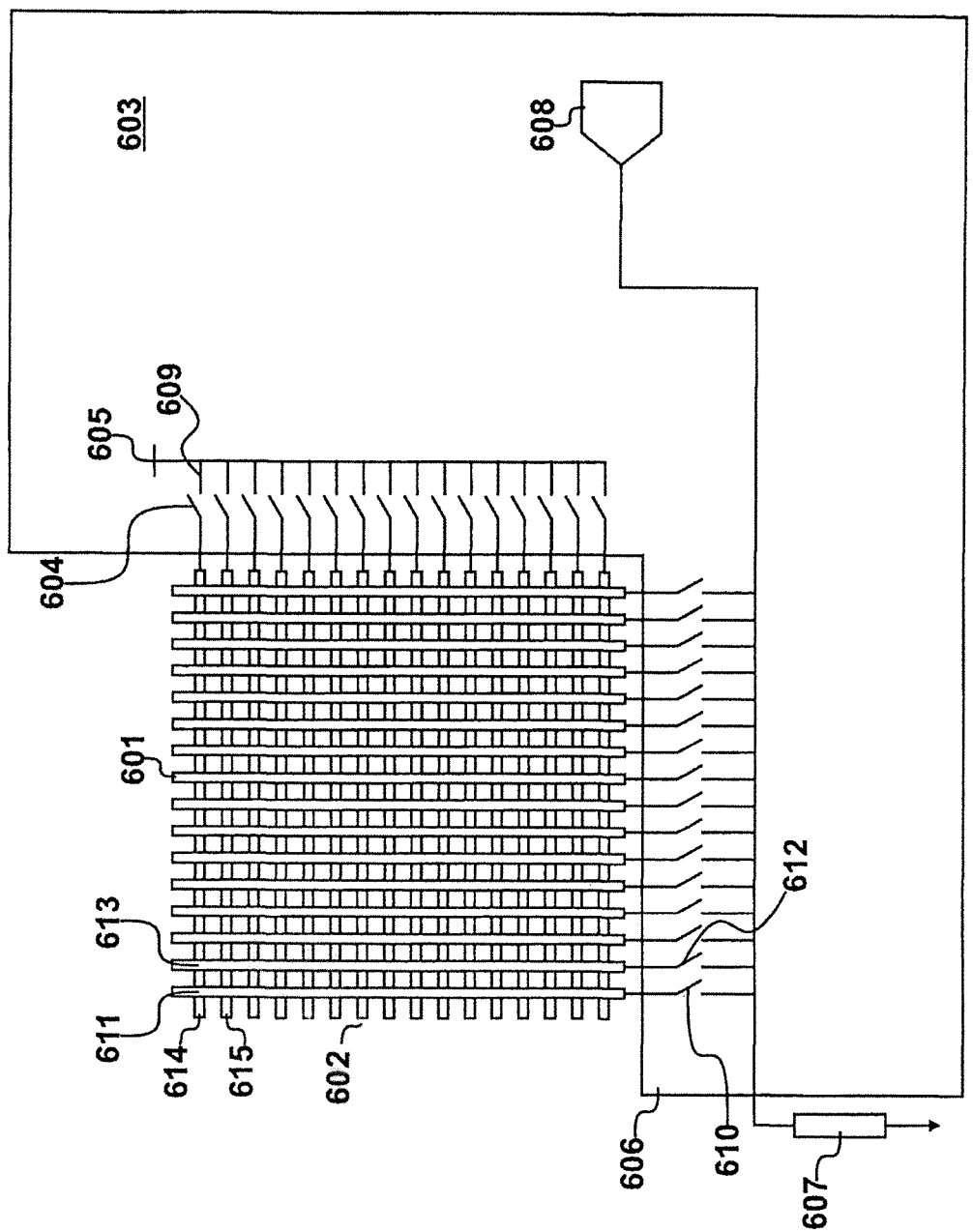
FIG. 6 illustrates a multiplexing array.

In order for a single microcontroller to consider input data from a substantial number of sensor-elements, it is possible to configure the devices in a multiplexing circuit, as illustrated in FIG. 6.

In the configuration of FIG. 6, a plurality of column conductors 601 are positioned above a plurality of row conductors 602. A sensor-element is provided at the intersection of each column conductor with each row conductor. Thus, at each intersection, pressure may be detected by energising a respective sensor-element.

To achieve a multiplexing operation, the microcontroller provides an electrical connection to each row conductor 602, along with an electrical connection to each column conductor 601. Instructions executed by the microcontroller 603 perform a multiplexing operation illustrated by a plurality of switches 604. Thus, switches 604 are activated sequentially such that, at any instant, only one of the row conductors 602 is connected to a drive voltage 604. Similarly, a plurality of switches 606 ensure that only one of the column conductors 601 is connected in series with a reference resistor 607 at any instant to define a voltage divider. A tapped voltage from this voltage divider is applied to an analog to digital convertor 608 such that, again, at any instant, only current from one of the column conductors 601 results in the application of a measureable voltage being applied to the analog to digital convertor 608.

When operational, a first switch of multiplexer 605 is activated. Thus, it may be assumed that switch 609 is activated. While activated, each of the input multiplexer switches is activated sequentially. Thus, a first switch 610 is closed, resulting in a measurement being made at detector position 611. Then, switch 612 is closed resulting in a measurement being made for detector position 613. Thus, this process continues across a first row 614.

Having sampled each position across row 614, the next row 615 is selected and the process is repeated. In this way, output lines of row 602 drive the detector array and column lines 601 sense values of the detector array. Thereafter, further instructions executed by the microcontroller 603 allow the resulting temporal signals to be converted back into a spatial representation, thereby allowing spatial interactions and movements to be detected from multiple independent locations.

FIG. 7

Figure 7:
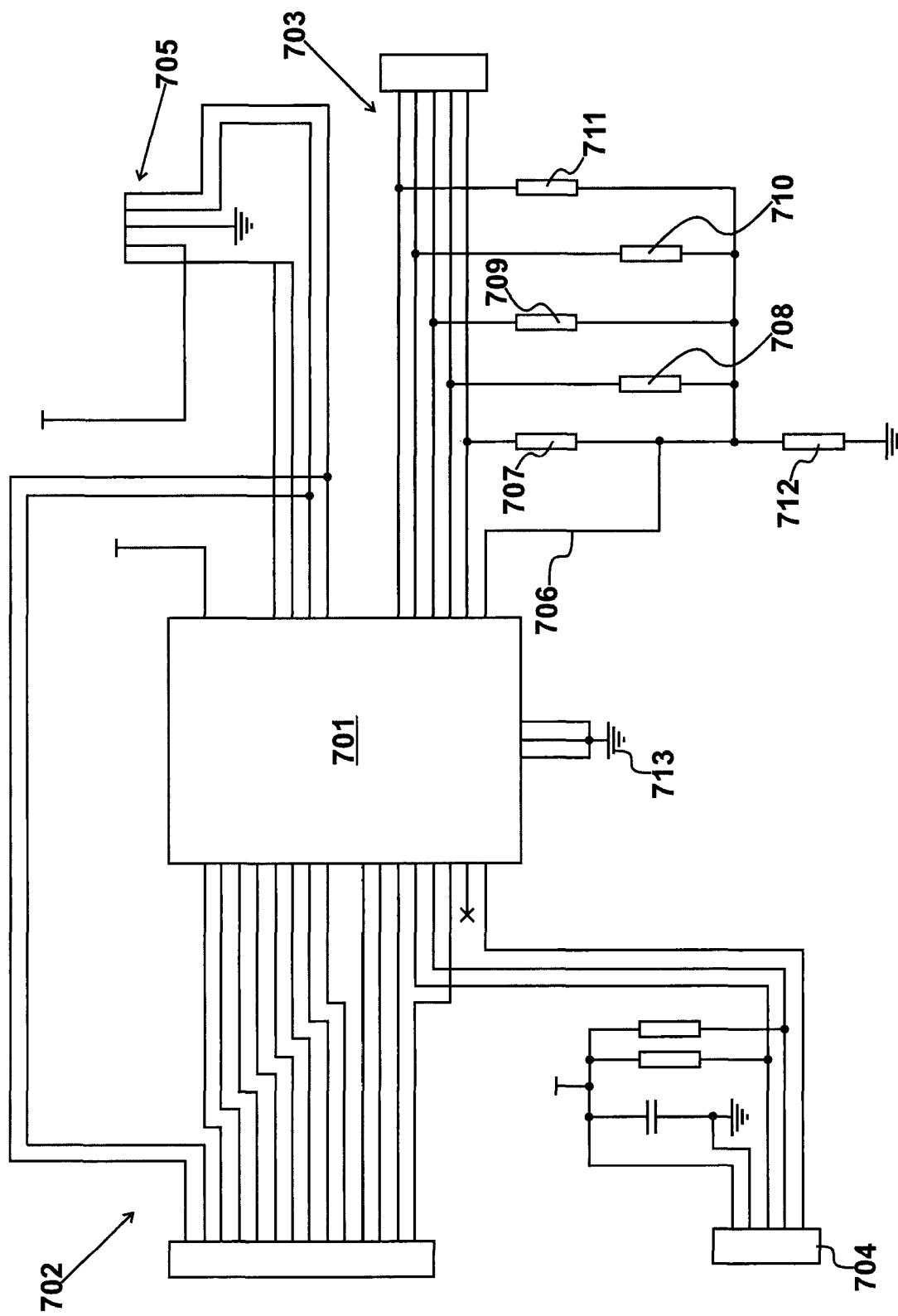
FIG. 7 details the circuit identified in FIG. 2, including a microcontroller.

An embodiment of a control circuit of the type identified in FIG. 2, implementing a multiplexing regime of the type described with respect to FIG. 6, is detailed in FIG. 7. A microcontroller 701 may be implemented as a PIC16LF1513 device. Some standard input/output pins are configured to provide analog output voltages from on-chip digital-to-analog convertors, while others are configured as anolog inputs that are converted to digital signals by appropriate anolog-to-digital convertors.

The apparatus of FIG. 2 defines a fourteen times five array of seventy individual sensor-elements. These are energized by fourteen drive lines 702 and to complete the matrix, they are sensed by five sense lines 703. A further input connector 704 may receive input signals from external devices and output pins 705 may supply output signals to external devices. Thus, in the implementation illustrated in FIG. 1, output pins 705 may supply signals to an infra-red transmitter for example.

An input pin of the microcontroller 701 is connected to an interrupt line 706. Each sense line is connected to a respective reference resistor 707 to 711. In an embodiment, these reference resistors may have a resistance of four thousand seven hundred ohms.

To achieve an interrupt function, a threshold resistor 712 is present. In an embodiment, the threshold resistor may have a resistance of four thousand seven hundred ohms. Thus, the apparatus is configured to produce an output control signal and has a housing, as shown in FIG. 1, that includes an interactive surface for receiving mechanical pressure due to operations performed by a user. Seventy sensor-elements are provided that are in mechanical proximity to the interactive surface and each of these is substantially electrically non-conductive before a mechanical interaction occurs and becomes increasingly conductive with increasing levels of interaction (i.e. pressure or force).

The microcontroller 701 has a minimal-power-dissipation state, an operational state and an interrupt input 706 for receiving an interrupt-voltage such that, in response to receiving a sufficient interrupt-voltage, the processing device is interrupted from its minimal-power-dissipation state and placed in an operational state. The microcontroller is configured to supply drive voltages on lines 702 to the sensor-elements and receive sense-currents on sense lines 703 from the sensor-elements. A voltage divider, provided by the reference resistors 707 to 711 in series with the threshold resistor 712, establishes an interrupt-voltage from the sense-currents. The voltage divider is configured such that an interrupt-voltage is only sufficient to interrupt the processor if a mechanical force exceeds a predetermined level.

In this embodiment, the predetermined level is set by the reference resistor 712. Thus, the sensitivity of the device may be increased by reducing the resistance of resistor 712. Alternatively, if a higher force is required to wake up the system, resistor 712 is replaced with a resistor of higher resistance. In an alternative embodiment, resistor 712 could be replaced with a variable device.

FIG. 8

Figure 8:
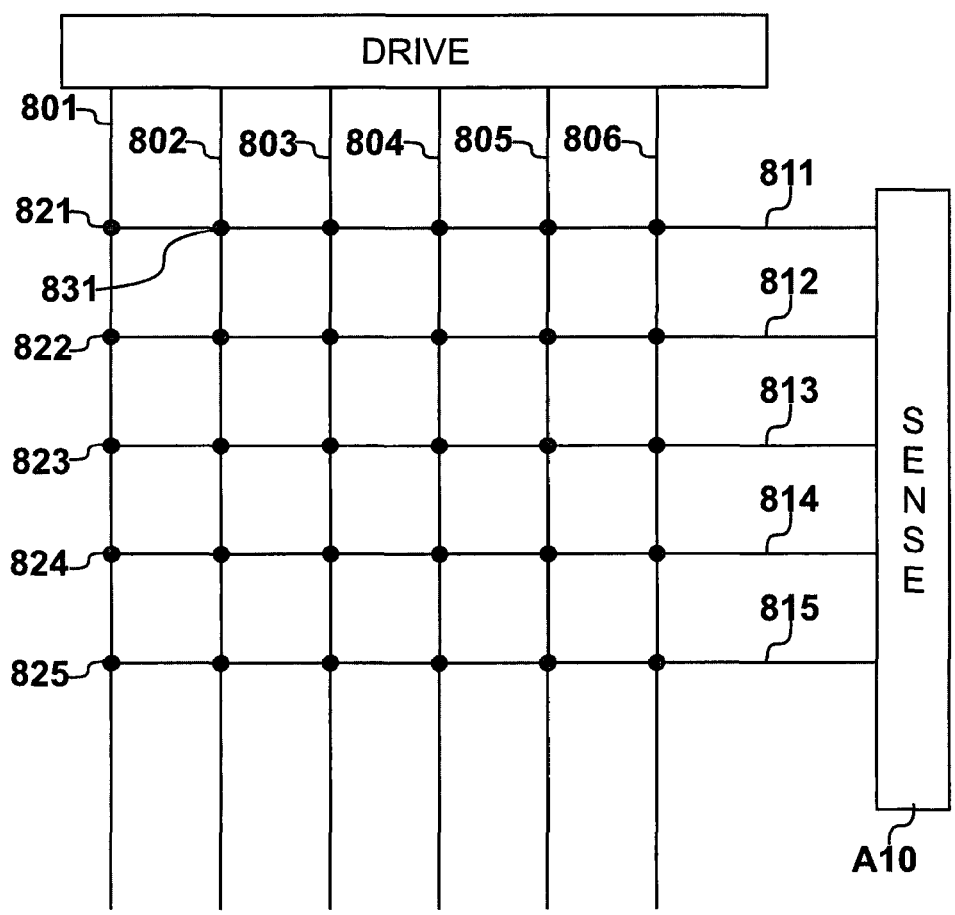
FIG. 8 shows a schematic representation of a touch-pad array.

A schematic representation of a touch-pad array is illustrated in FIG. 8. A voltage is sequentially applied to each drive line 801 to 806. Thus, line 801 is energised followed by the energisation of line 802 and then line 803 etc.

The array also includes sense lines 811, 812, 813, 814 and 815. Thus, during the energisation of line 801, sense line 811 is sensed, followed by sense line 812, followed by sense line 813, followed by sense line 814 and then followed by sense line 815. This sensing cycle is then repeated when drive line 802 is energised and again when drive line 803 is energised etc. Thus, the sensing or sampling occurs at a faster rate than that driving.

Each individual intersection is sensed to detect pressure applied to the sensor-element at that intersection. Thus, pressure values are determined for intersection 821, followed by intersection 822, followed by intersection 823, followed by intersection 824 and followed by intersection 825. This process is then repeated for drive line 802, thereby starting with a determination of a pressure at intersection 831.

FIG. 9

Figure 9:
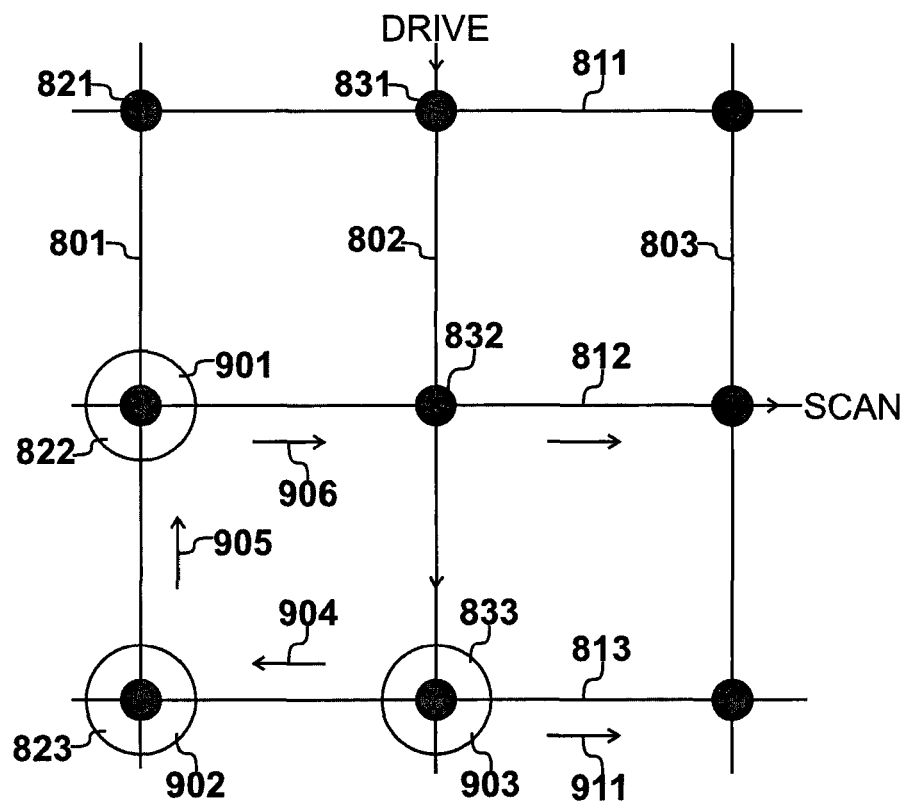
FIG. 9 shows an enlarged version of the array identified in FIG. 8.

An enlarged version of the array shown in FIG. 8 is detailed in FIG. 9, to illustrate the "ghost finger" problem. In this example, applied pressures, due to interactions with a user's fingers, are illustrated by circles 901, 902 and 903. Thus, following a scanning process, correct interactions will have been identified at intersections 822, 823 and 833.

During the driving of drive line 802 and the scanning of scan line 812, the interaction at intersection 833 allows current to flow, as indicated by arrow 904, to intersection 823. The application of pressure 902 at intersection 823 allows current to flow in the direction of arrow 905. Similarly, the interaction 901 at intersection 822 allows current to flow in the direction of arrow 906. Consequently, when driving drive line 802, an output will be seen on scan line 812 in addition to an output being seen at scan line 813. This will suggest that a finger press has occurred at intersection 832 but no such finger press actually exists. Thus, interaction 901, interaction 902 and interaction 903 result in the creation of a ghost interaction, at intersection 832.

FIG. 10

Figure 10:
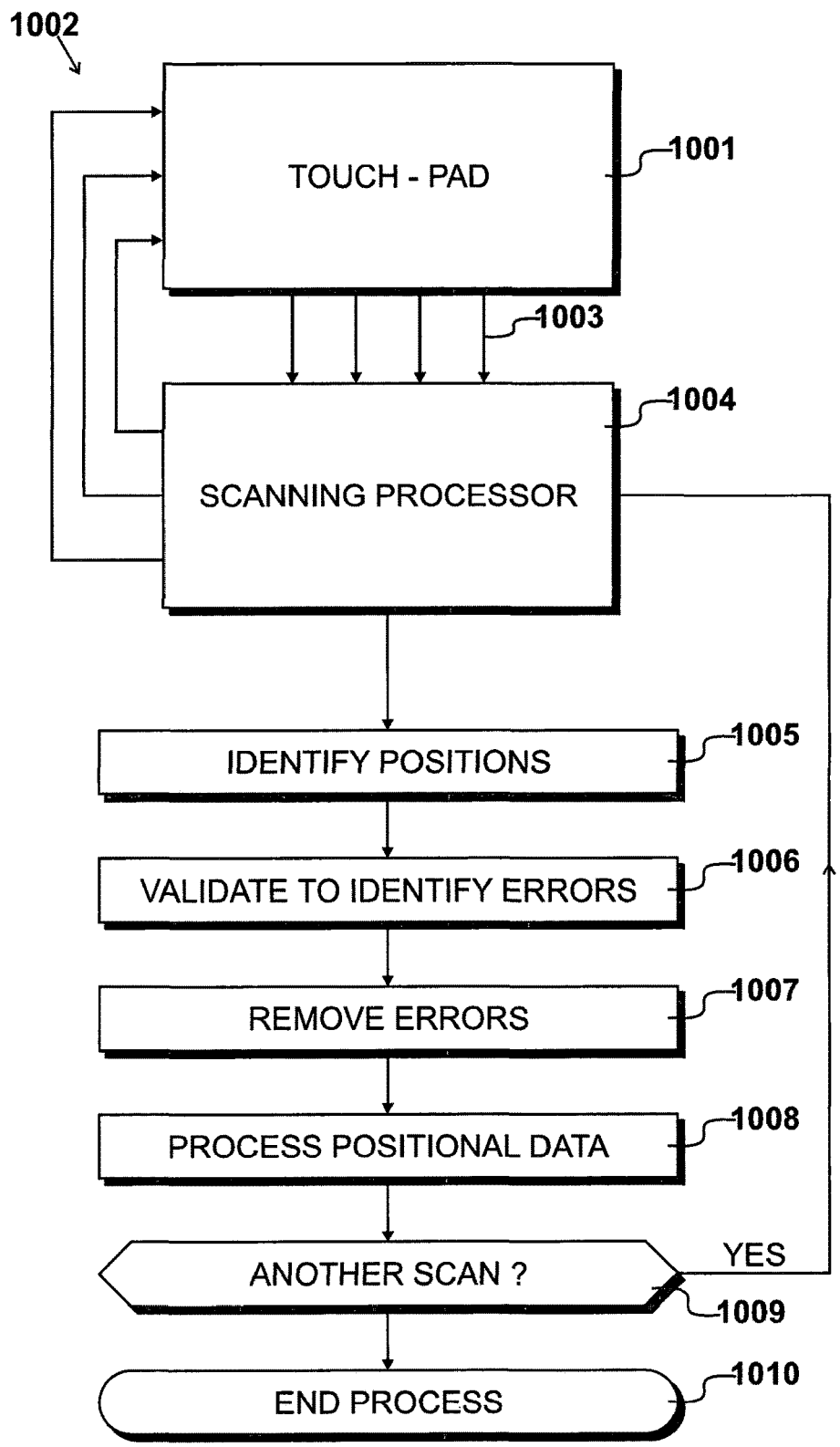
FIG. 10 shows an example of an apparatus for detecting multiple manual interactions.

An example of an apparatus for detecting multiple manual interactions embodying an aspect of the present invention is illustrated in FIG. 10. A touch-pad 1001, similar to that shown in FIG. 2, receives multiple manual interactions. A plurality of drive lines 1002 intersect with a plurality of scan lines 1003. Furthermore, each intersection between a drive line and a scan line includes an element of variable resistance.

A scanning processor 1004 energises the drive lines 1002 and monitors the scan lines 1003 such that, as indicated at step 1005, the processor identifies positions of manual interaction. However, the positions identified at step 1005 may include errors, due to the parallel transmission paths.

A further process is performed, as illustrated at step 1006, to validate correctly identified positions while removing erroneous positons. Thus, at step 1006 identified positions can be validated as true, whereas other positions are labelled as suspect and require further attention.

At step 1007 each suspect position is analysed and those considered to represent errors are removed. Thereafter, at step 1008 the positional data may be processed with reference to pressure measurements. Thereafter, a question is asked at step 1009 as to whether further positional data is required and when answered in the affirmative, further scanning operations are performed by the scanning processor 1004. Alternatively, when answered in the negative, the process ends at step 1010.

Thus, in an embodiment, the scanning processor 1004 identifies erroneous positons due to the drive lines and the scan lines creating parallel transmission paths, as illustrated in FIG. 9.

FIG. 11

Figure 11:
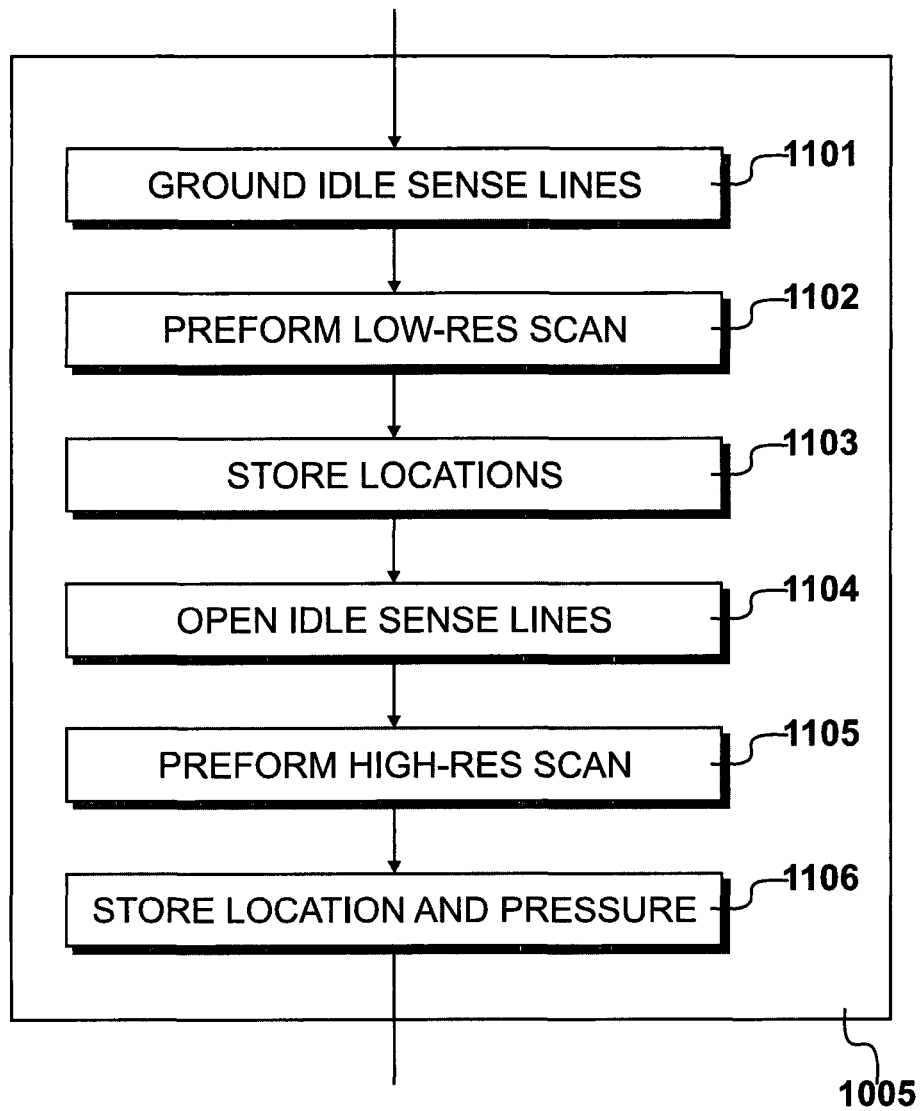
FIG. 11 details the step identified in FIG. 10 for identifying positions.

An example of step 1005, for identifying positions, is detailed in FIG. 11. In this embodiment, the scanning processor 1004 is configured to identify positions by performing a first scanning operation and a second scanning operation, wherein the second scanning operation is performed under different conditions to the first scanning operation. In this way, the results of the first scanning operation and those of the second scanning operation may be compared to facilitate the validation process 1006.

In an embodiment, the scanning processor 1004 performs the first scanning operation at a first pressure resolution. It then performs a second scanning operation at a second pressure resolution, wherein the first pressure resolution is lower than the second pressure resolution, whereafter positions not identified by the first (lower) pressure resolution may be considered for removal.

In the embodiment shown in FIG. 11, idle sense lines are grounded at step 1101. Thus, in the example described with reference to FIG. 9, while a scanning operation is being performed on scan line 812, the idle lines, lines 811 and 813 in FIG. 9 are grounded, so that any current supplied to these grounded lines will not be available for conducting elsewhere in the array. Thus, when driving line 802, pressure applied at intersection 833 allows conduction to scanning line 813. However, by grounding this line, current is no longer available to conduct through intersection 823 and therefore cannot be passed on to drive line 801. Consequently, the currents indicated by arrows 904, 905 and 906 will not be present.

Thus, when the idle scan lines are grounded, the ghost finger does not appear at intersection 832. However, a proportion of the current that would have appeared at scan line 812, in response to the energisation of drive line 801, will dissipate to ground due to the interaction at intersection 823 supplying current to ground, as illustrated by arrow 911.

As indicated at step 1102, the grounding of the idle sense lines at step 1101 results in the performing of a low-resolution pressure scan in the Z dimension at step 1102. This has the advantage of not creating erroneous ghost finger locations but it will result in two distinct disadvantages. Firstly, resolution has been lost due to the dissipation of current. Thus, the overall sensitivity and accuracy of the sensor array has been downgraded. Secondly, some correct positions of interaction will be lost; resulting in an overall degradation of the sensor characteristics. Consequently, in this embodiment, locations of low resolution interactions are stored at step 1103 but pressure values are not.

At step 1104 a scanning operation is repeated. However, on this occasion, the idle sense lines are left open circuit, by a high impedance at the scanning processor; such that a high-resolution scan is then performed at step 1105. Thereafter, at step 1106, the locations of interactions are stored and, in addition, pressure values for each interaction are also stored.

Thus, by performing two scans under different operating conditions, a first set of data has been retained which identifies positions where real interactions must have taken place. However, it is appreciated that this scan cycle has not produced useful data for measuring pressure. Thereafter, a second similar scan has been performed which may include erroneous data but has accurate pressure measurements to facilitate ongoing data manipulation. Thus, in this way, it is possible for some of the identified positions to be validated as good at step 1006, whereafter erroneous positions may be removed at step 1007.

FIG. 12

Figure 12:
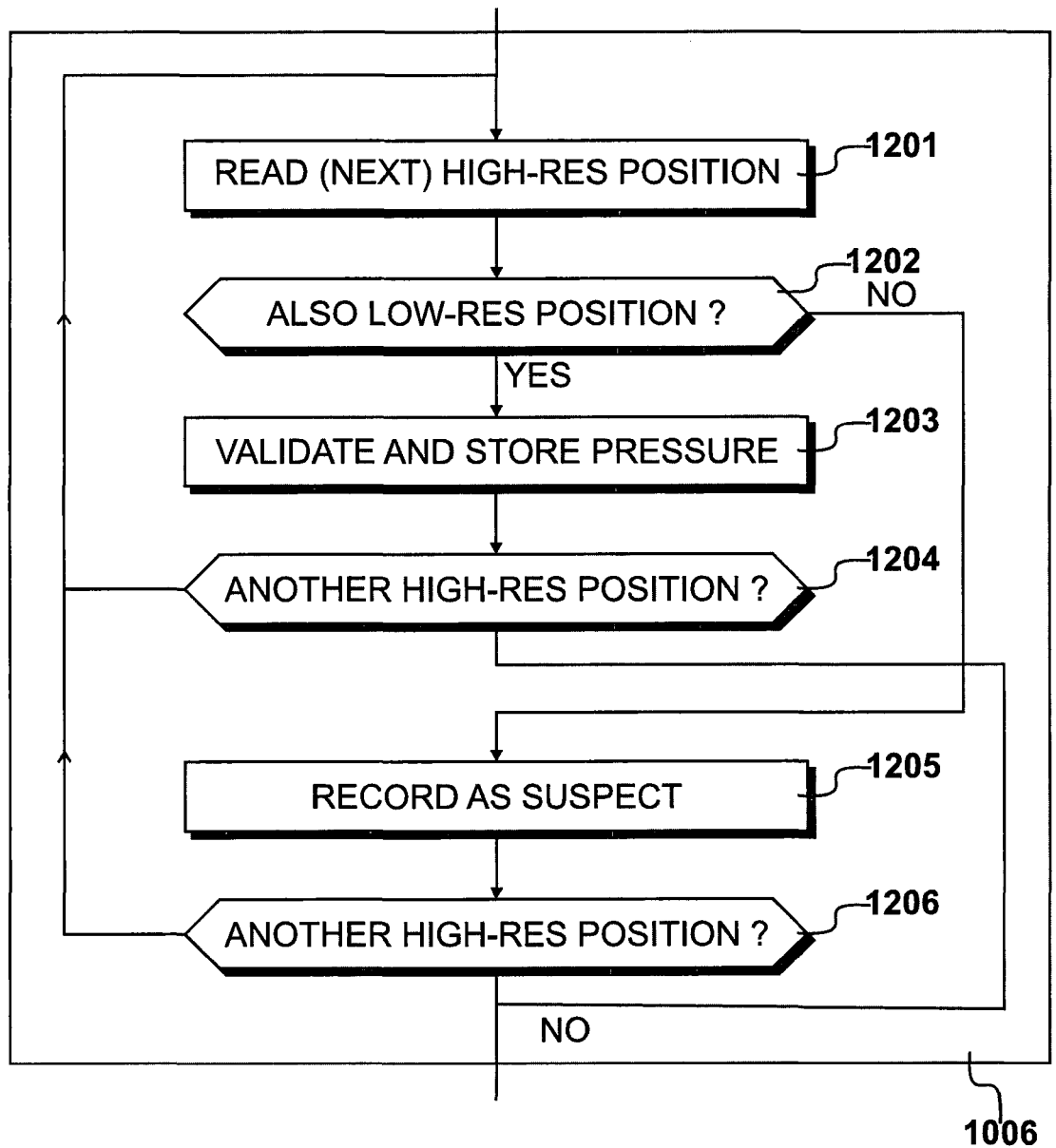
FIG. 12 details the procedures identified in FIG. 10 for validating identified positions.

An example of procedures 1006 for validating identified positions are detailed in FIG. 12. The procedures provide a method of detecting positons of multiple manual interactions on a touch-pad. The method comprises the steps of energising a plurality of drive lines sequentially and monitoring a plurality of intersecting scan lines to locate positions of interaction that may include erroneous positions. The procedures shown in FIG. 12 allow a validating operation to be performed to remove erroneous positions.

In this embodiment, a high-resolution scan has been performed at step 1105, thereby providing data representing positions and a measure of applied pressure; usually referred to as a measurement in the z dimension. Thus, at step 1201, a high-resolution position is read and a question is then asked at step 1202 as to whether a similar position exists for the data generated at step 1102; when the low-resolution scanning operation was performed.

If the question asked at step 1202 is answered in the affirmative, the position is validated at step 1203 and the pressure value is stored. Thus, if the positional data exists at both high resolution and at low resolution, it is assumed to be correct and the pressure value of interest is that determined at high resolution. Alternatively, if the question asked at step 1202 is answered in the negative, the position is recorded as being suspect at step 1205; but at this stage it is not actually removed from the data set.

At step 1204 a question is asked as to whether another high-resolution position is to be considered following step 1203 and a similar question is asked at step 1206 following step 1205. Thus, the next high-resolution position is selected at step 1201 and again the position is either validated as being correct at step 1203 or recorded as being suspect at step 1205. Eventually all of the high-resolution positions will have been considered and control will transfer to step 1007.

FIG. 13

Figure 13:
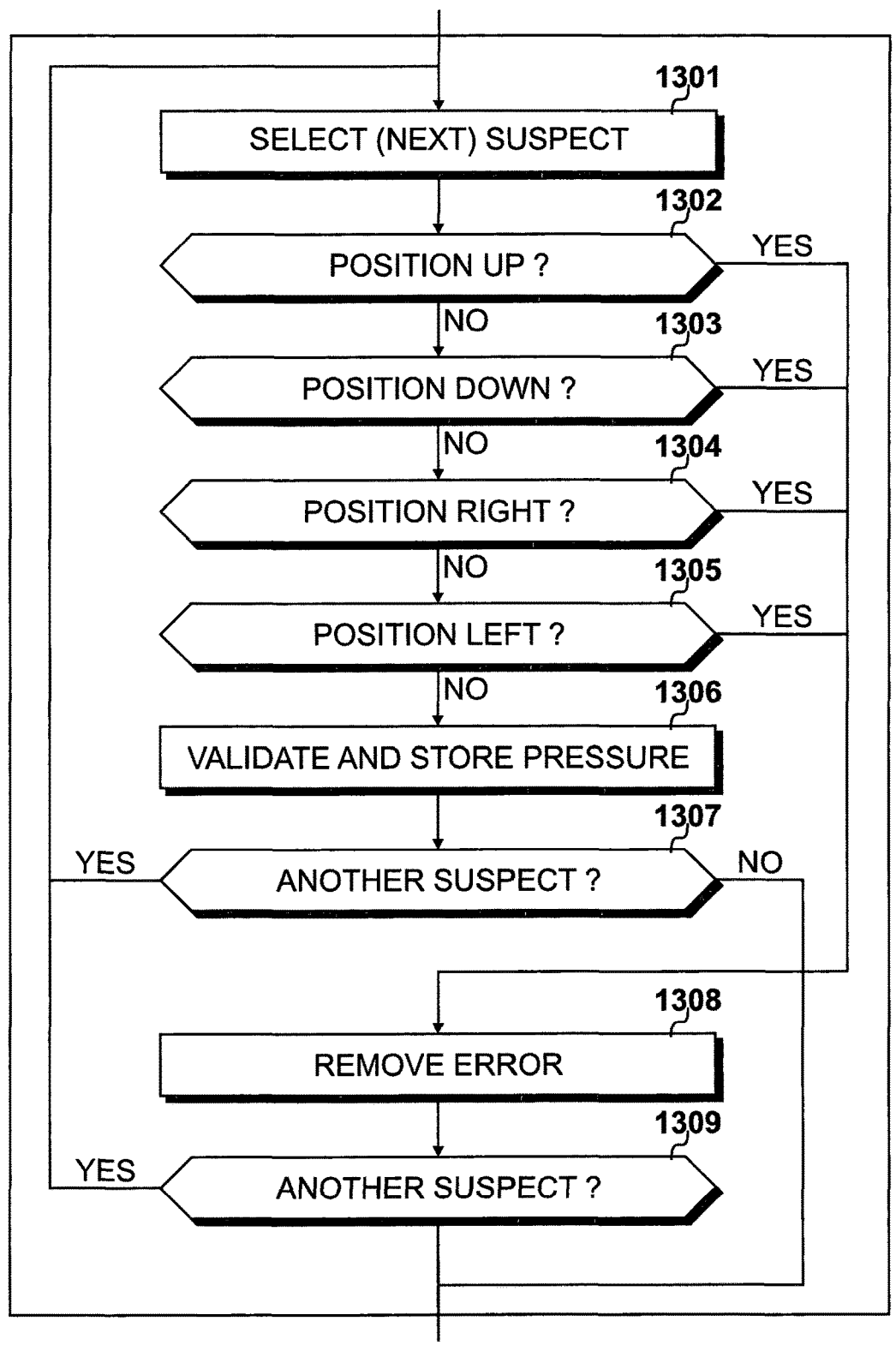
FIG. 13 details procedures identified in FIG. 10 for removing erroneous positions.
Figure 14:
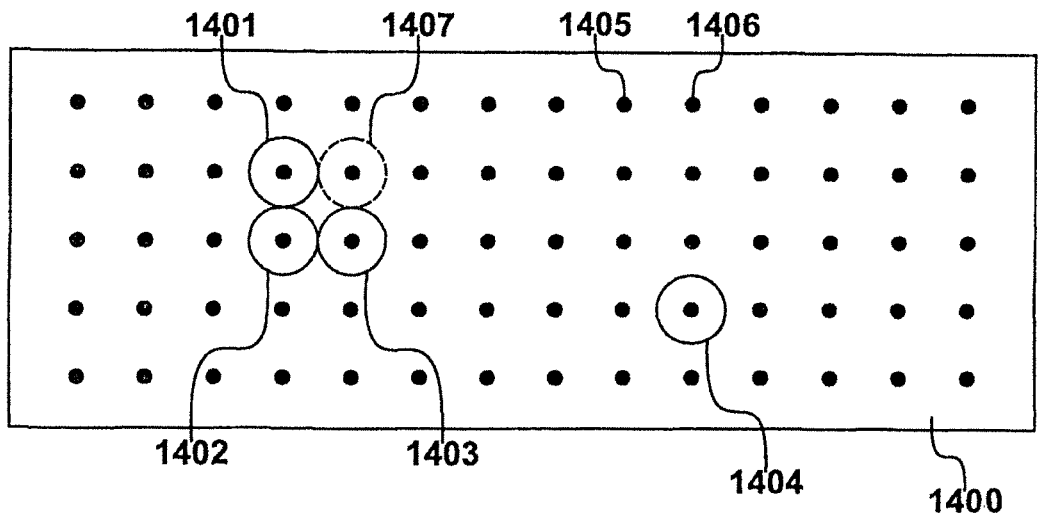
FIG. 14 shows an example of positions identified at high resolution.

Procedures 1007 for removing erroneous positions are detailed in FIG. 13. Following step 1205, suspect positions have been recorded, therefore a first suspect is selected at step 1301. In this embodiment, the removal-of-errors process considers all of the positions identified as being suspect. Thus, as previously described, a suspect is identified when a position exists at high resolution but does not exist at low resolution. If this suspect is in the vicinity of other real interactions, an assumption is made to the effect that the suspect is a ghost effect and represents an error that may be removed. However, if the suspect is significantly displaced from other interactions, it is assumed not to be an error and merely represents a position where an interaction has taken place but at a relatively low-pressure level.

In this embodiment, a suspect is identified as an error if it is directly adjacent to a correctly identified position. Thus, at step 1302 a question is asked as to whether a position has been identified that is directly up from the suspect. Thereafter, if negative at step 1032 a similar question is asked at step 1303 as to whether a position exists directly down from the suspect. Again if answered in the negative, a question is asked at step 304 as to whether a position exists to the right and again, when answered in the negative, a question is asked at step 1305 as to whether a position exists to the left. Thus, if any of questions asked at steps 1302 to 1305 are answered in the affirmative, the suspect is seen as an error and is removed from the data set at step at 1308.

If all questions 1302 to 1305 are answered in the negative, the suspect is not close to a previously validated position, therefore the suspect is itself validated at step 1306 and its pressure value is stored. Thereafter, at step 1307 a question is asked as to whether another suspect is present and when answered in the affirmative, the next suspect is selected at step 1301.

Similarly, if an erroneous position is removed at step 1308, a question is asked at step 1309 as to whether another suspect is present and again when answered in the affirmative, the next suspect is selected at step 1301.

In response to the question asked at step 1307 or the question asked at step 1309 being answered in the negative, control is directed to step 1008 for the positional data to be processed.

FIG. 14

In an embodiment, an apparatus is provided for receiving data input from the user in which a user applies a plurality of fingers upon a touch-pad 1400, indicated by positions

1401, 1402, 1403 and 1404. As described with reference to FIG. 10, the drive lines intersect with the scan lines to define an array. A variable resistive element is provided at each intersection of the array, thereby providing a variable electrically conductive path in response to an application of mechanical pressure. Thus, the array 1400 includes resistive elements, such as element 1405 and element 1406.

A processor performs a first scanning operation with a first pressure resolution to locate positions of true pressure application. This is the low-resolution scan performed at step 1102. A second scanning operation is executed, with a second pressure resolution, higher than said first pressure resolution, rendering said second scanning operation prone to erroneous position identifications. Thus, this may be the high-resolution scan performed at step 1105. Thereafter, pressure measurements from the second scanning operation are rejected at positions not located by the first scanning operation.

In this example, the high-resolution scan performed at step 1105 has also identified location 1407, due to the ghosting effect described with reference to FIG. 9.

FIG. 15

Figure 15:
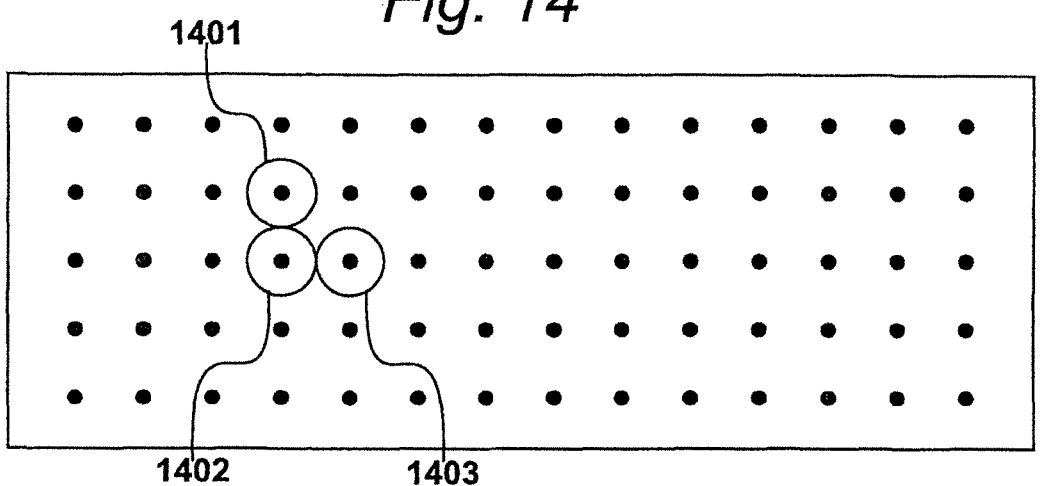
FIG. 15 details positions identified at low resolution.

Detected positions, identified as a result of the low-resolution scan performed at step 1102, are shown in FIG. 15. This low-resolution scan has identified locations 1401, 1402 and 1403. However, it has not identified location 1407 and it has not identified location 1404. As a result of this, locations 1407 and 1404 will be selected at step 1201. However, when selected, the question asked at step 1202 will be answered in the negative, because these positions do not exist in the low-resolution data. Consequently, these will be recorded as being suspect at step 1205.

Suspect 1407 will be selected at step 1301. At step 1302 a question is asked as to whether an identified position also exist one intersection up and for this position, the question will be answered in the negative. However, at step 1303, a question is asked as to whether an identified position exists at one intersection down and, on this occasion, previously identified position 1403 will be found; resulting in the question asked at step 1303 being answered in the affirmative. It can also be seen that if carried out, the question asked at step 1305 would also be answered in the affirmative but having answered the question at 1303 in the affirmative, the location is removed as an error at step 1308.

Position 1404 will be selected as a suspect at step 1301. However, on this occasion, position 1404 is not surrounded by any other locations. Consequently, all of questions at steps 1302 to 1305 will be answered in the negative, such that the position will be validated at step 1306 and the high-resolution pressure measurement stored.

FIG. 16

Figure 16:
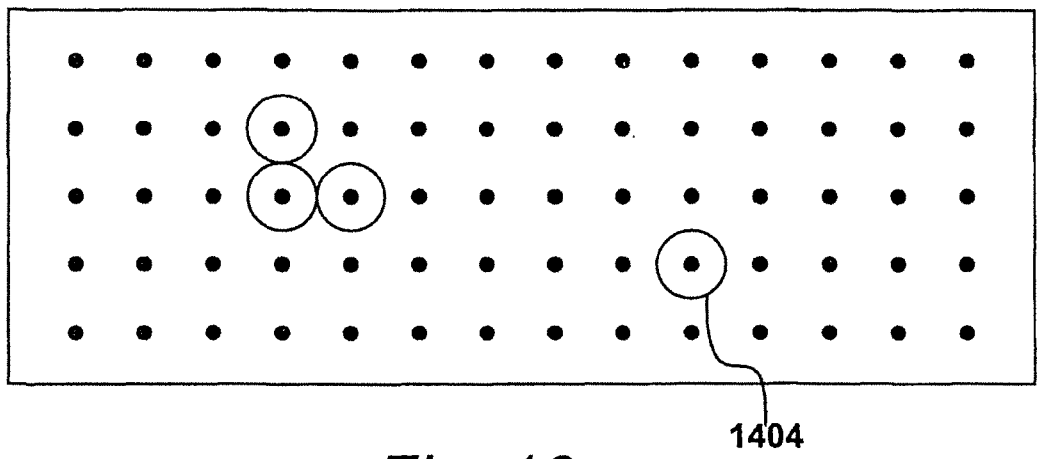
FIG. 16 identifies the result of removing positions considered to be erroneous.

FIG. 16 represents the data that will be transferred to processing step 1008. Remote location 1404 of relatively low pressure is retained and its importance will be determined by the processing procedures 1008. It may represent an error caused by a user accidentally placing a finger on the touch-pad. However, for the purposes of this invention, the touch is valid and has not been created by the ghost finger effect.

In this example, location 1407 was identified due to the ghost finger effect. This has been removed because it was not detected during the low-resolution scan at step 1102. It was detected by the high-resolution scan at 1105 and this discrepancy led to it being identified as a suspect at step 1205. Furthermore, procedures 1302 to 1305 confirmed its proximity to another detected position and it was therefore removed as an erroneous location.

What is claimed:

1. An apparatus for detecting multiple manual interactions, comprising:
   a touch-pad for receiving multiple manual interactions;
   a plurality of drive lines intersecting a plurality of scan lines, wherein each intersection between a drive line and a scan line includes an element of variable resistance;
   a scanning processor for energizing said drive lines and monitoring said scan lines, said scanning processor is configured to sequentially monitor said scan lines, and ground remaining non-monitored scan lines during a first scanning operation,
   said scanning processor is configured to apply a high substantially non-conducting impedance to said non-monitored scan lines during a second scanning operation, wherein said scanning processor is further configured to:
   identify positions of manual interaction by performing said first scanning operation and said second scanning operation;
   perform said first scanning operation at a first pressure resolution;
   perform said second scanning operation at a second pressure resolution, wherein said first pressure resolution is lower than said second pressure resolution;
   remove positions not identified by said first lower pressure resolution;
   validate identified positions to identify potentially erroneous positions;
   remove positions identified as erroneous; and
   following said step of removing positions identified as erroneous, re-introduce removed positions when said removed positions are not directly adjacent to a correctly identified position such that said removed positions are determined as valid.

2. The apparatus of claim 1, wherein said scanning processor identifies erroneous positions due to said drive lines and said scan lines creating parallel transmission paths.

3. The apparatus of claim 1, wherein said scanning processor is configured to determine pressure values based on current for identified positions that have not been removed.

4. A method of detecting positions of multiple manual interactions on a touch-pad, comprising the steps of:
   energizing a plurality of drive lines sequentially;
   monitoring a plurality of intersecting scan lines sequentially to locate positions of interaction that may include erroneous positions, wherein remaining non-monitored scan lines are grounded during a first scanning operation and a high substantially non-conducting impedance is applied to said non-monitored scan lines during a second monitoring operation;
   performing a validating operation to identify candidates for removal at said erroneous positions and removing erroneous positions located by the introduction of parallel transmission paths; and
   re-introducing said candidates for removal when they are not directly adjacent to a correctly identified position such that said removed candidates are determined as valid,
   said validating operation includes the step of performing an additional second scanning operation, performing said first scanning operation at a first pressure resolution;

performing said second scanning operation at a second pressure resolution, said first pressure resolution is lower than said second pressure resolution; and identifying positions not identified at said first lower pressure resolution as candidates for removal from a set of positions identified at said second higher pressure resolution.

5. The method of claim 4, wherein said erroneous positions are identified due to said drive lines and said scan lines creating parallel transmission paths.

6. An apparatus for receiving data input from a user, in which a user applies a plurality of fingers on a touch-pad, said apparatus comprising a touch-pad and further comprising:

a plurality of drive lines that intersect with a plurality of scan lines to define an array;

a variable resistive element at each intersection of said array providing a variable electrically conductive path in response to an application of mechanical pressure; wherein all non-scanning scan lines have their respective inputs made electrically conductive to ground during each performance of a first scanning operation and all non-scanning lines have their respective inputs made substantially non-conductive during each execution of a second scanning operation; said apparatus further comprising:

a processor, wherein said processor is configured to:

sequentially energize each of said drive lines;

perform said first scanning operation with a first pressure resolution to locate positions of true pressure application;

execute said second scanning operation with a second pressure resolution higher than said first pressure resolution rendering said second scanning operation prone to erroneous pressure identification;

rejecting pressure measurements from said second scanning operation at positions not located by said respective first scanning operation;

generate output signals based on pressure measurements that have not been rejected; and re-introducing said rejected pressure measurements at positions that are not directly adjacent to a correctly identified position of true pressure application such that said rejected pressure measurements are determined as valid pressure measurements.

7. The apparatus of claim 6, wherein said scanning processor identifies erroneous pressure measurements due to said drive lines and said scan lines creating parallel transmission paths.

8. The apparatus of claim 6, wherein said scanning processor is configured to determine pressure measurements based on current for identified positions that have not been rejected.

* * * * *